United States Patent
Bardhan et al.

(10) Patent No.: US 10,447,589 B2
(45) Date of Patent: Oct. 15, 2019

(54) TRANSPORT SEGMENT OAM ROUTING MECHANISMS

(71) Applicant: Infinera Corporation, Sunnyvale, CA (US)

(72) Inventors: Sanjoy Bardhan, San Jose, CA (US); Madhukar Anand, Fremont, CA (US); Ramesh Subrahmaniam, Fremont, CA (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 15/389,696

(22) Filed: Dec. 23, 2016

(65) Prior Publication Data
US 2018/0013669 A1      Jan. 11, 2018

Related U.S. Application Data

(60) Provisional application No. 62/359,484, filed on Jul. 7, 2016.

(51) Int. Cl.
*H04L 12/715* (2013.01)
*H04L 12/931* (2013.01)

(52) U.S. Cl.
CPC ............ *H04L 45/64* (2013.01); *H04L 49/351* (2013.01); *H04L 49/70* (2013.01)

(58) Field of Classification Search
None
See application file for complete search history.

(56) References Cited

U.S. PATENT DOCUMENTS

| | | | |
|---|---|---|---|
| 2012/0155283 A1* | 6/2012 | Sanguineti | H04L 41/0226 370/241.1 |
| 2012/0271928 A1* | 10/2012 | Kern | H04L 41/084 709/220 |
| 2014/0269266 A1* | 9/2014 | Filsfils | H04L 43/50 370/228 |
| 2016/0219024 A1* | 7/2016 | Verzun | H04L 63/102 370/242 |
| 2016/0261474 A1* | 9/2016 | Raghavan | H04L 43/10 370/242 |
| 2017/0041219 A1* | 2/2017 | Bryant | H04L 45/28 370/242 |
| 2017/0257684 A1* | 9/2017 | Anand | H04Q 11/0066 370/242 |
| 2017/0324647 A1* | 11/2017 | Anand | H04L 45/021 370/242 |

* cited by examiner

*Primary Examiner* — Anh Vu H Ly
(74) *Attorney, Agent, or Firm* — David L. Soltz

(57) ABSTRACT

Systems, methods, and devices for determining a property of, or isolating a fault in, a transport segment. A packet portion test packet can be transmitted over a packet portion of a transport segment. Packet portion results can be received in response to the packet portion test packet. A transport portion test packet can be transmitted over a transport portion of the transport segment. Transport portion results can be received in response to the transport portion test packet. The packet portion results and the transport portion results can be correlated to generate correlated test results. The correlated test results can be processed to determine the property of, or isolate the fault in, the transport segment.

16 Claims, 10 Drawing Sheets

TRANSPORT SEGMENT OAM ROUTING MECHANISMS

CROSS REFERENCE TO RELATED APPLICATION

This application claims the benefit of U.S. Provisional Patent Application No. 62/359,484, filed Jul. 7, 2016, which is incorporated by reference as if fully set forth.

FIELD OF INVENTION

The invention relates generally to communications networking and more particularly to transport network routing.

BACKGROUND

Segment routing (SR) is a technique for forwarding a packet on a network using source based routing to steer the packet through a series of packet network "segments". Each network segment represents a logical path, topological or service-based, through the network. A packet source, such as a router, switch, trusted server, virtual forwarder running on a hypervisor, or other network node, chooses a forward path for the packet through the network and encodes the path in the packet header as an ordered list of segments, for example, as a stack of labels. In a label-switched network, packets can be encoded with a sequence of entries called a "label stack" (each entry called a "label" or "label stack entry"). The labels are ordered, and each specifies a next hop along a path through a network. When the packet arrives at a router, that router's label can be removed or "popped" from the label stack, and the next label in the stack can used to calculate the next hop. Labels may also specify other actions to be taken at a particular hop. In this manner, the network may transmit packets along a specific forward path through the packet network, other than the normal shortest path that a packet usually takes, and allows the network to enforce packet flow through any topological path and service chain while maintaining a per-flow state only at the packet source. Operations Administration and Maintenance (OAM) protocols, in general, are standards based approaches to performance and fault monitoring in computer communications networks. OAM packet layer standards exist, however these standards do not address the transport layer. OAM transport layer standards exist, however these standards do not address the packet layer.

SUMMARY

Some embodiments provide a method of determining a property of a transport segment. A packet portion test packet can be transmitted over a packet portion of a transport segment. Packet portion results can be received in response to the packet portion test packet. A transport portion test packet can be transmitted over a transport portion of the transport segment. Transport portion results can be received in response to the transport portion test packet. The packet portion results and the transport portion results can be correlated to generate correlated test results. The correlated test results can be processed to determine the property of the transport segment.

In some embodiments, a notification can be generated and transmitted based on the determined property. The notification can be transmitted to initiate a remedial measure based on the determined property. The test packet can include a ping packet or a bidirectional forwarding detection (BFD) packet. The packet portion test packet and the transport portion test packet can be transmitted by a packet-transport gateway device. The packet portion test packet and the transport portion test packet can be transmitted by a packet-transport gateway device in response to receiving the test packet from a transport segment routing (TSR) operations administration and management (OAM) controller. The property can include a latency, a bandwidth, a throughput, and/or a reliability.

Some embodiments provide a device for determining a property of a transport segment. The device can include packet transmitter circuitry configured to transmit a packet portion test packet over a packet portion of a transport segment. The packet receiver circuitry can be configured to receive packet portion results in response to the packet portion test packet. The transport transmitter circuitry can be configured to transmit a transport portion test packet over a transport portion of the transport segment. The transport receiver circuitry can be configured to receive transport portion results in response to the transport portion test packet. The device can include correlation circuitry configured to correlate the packet portion results and the transport portion results to generate correlated test results. The device can include processing circuitry configured to process the correlated test results to determine the property of the transport segment.

In some embodiments, the device includes circuitry configured to generate and transmit a notification based on the determined property. The notification can be transmitted to initiate a remedial measure based on the determined property. The test packet can include a ping packet or a bidirectional forwarding detection (BFD) packet. The packet portion test packet and the transport portion test packet can be transmitted by a packet-transport gateway device. The packet portion test packet and the transport portion test packet can be transmitted by a packet-transport gateway device in response to receiving the test packet from a transport segment routing (TSR) operations administration and management (OAM) controller. The property can include a latency, a bandwidth, a throughput, or a reliability.

Some embodiments include a method of detecting a fault in a transport segment. A packet network and transport network topology can be received, including link characteristics and potential faults. A packet portion test packet can be transmitted over a packet portion of a transport segment based on the received topology. Packet portion results can be received in response to the packet portion test packet. A transport portion test packet can be transmitted over a transport portion of the transport segment based on the received topology. Transport portion results can be received in response to the transport portion test packet. The packet portion results and the transport portion results can be correlated to generate correlated test results. The correlated test results can be processed to determine whether there is a fault in the transport segment.

In some embodiments, on a condition that it is determined that the fault is in the transport segment, the correlated test results are processed to determine whether the fault is in the packet portion or the transport portion. A notification can be generated and transmitted based on whether a fault is determined, wherein the notification is transmitted to initiate a remedial measure based on whether a fault is determined. The packet portion test packet or the transport portion test packet can include a ping packet or a bidirectional forwarding detection (BFD) packet. The packet portion test packet and the transport portion test packet can be transmitted by a packet-transport gateway device. The packet portion test packet and the transport portion test packet can be transmitted by a packet-transport gateway device in response to receiving the test packet from a transport segment routing (TSR) operations administration and management (OAM) controller.

DETAILED DESCRIPTION OF THE PREFERRED EMBODIMENT(S)

Figure 1:
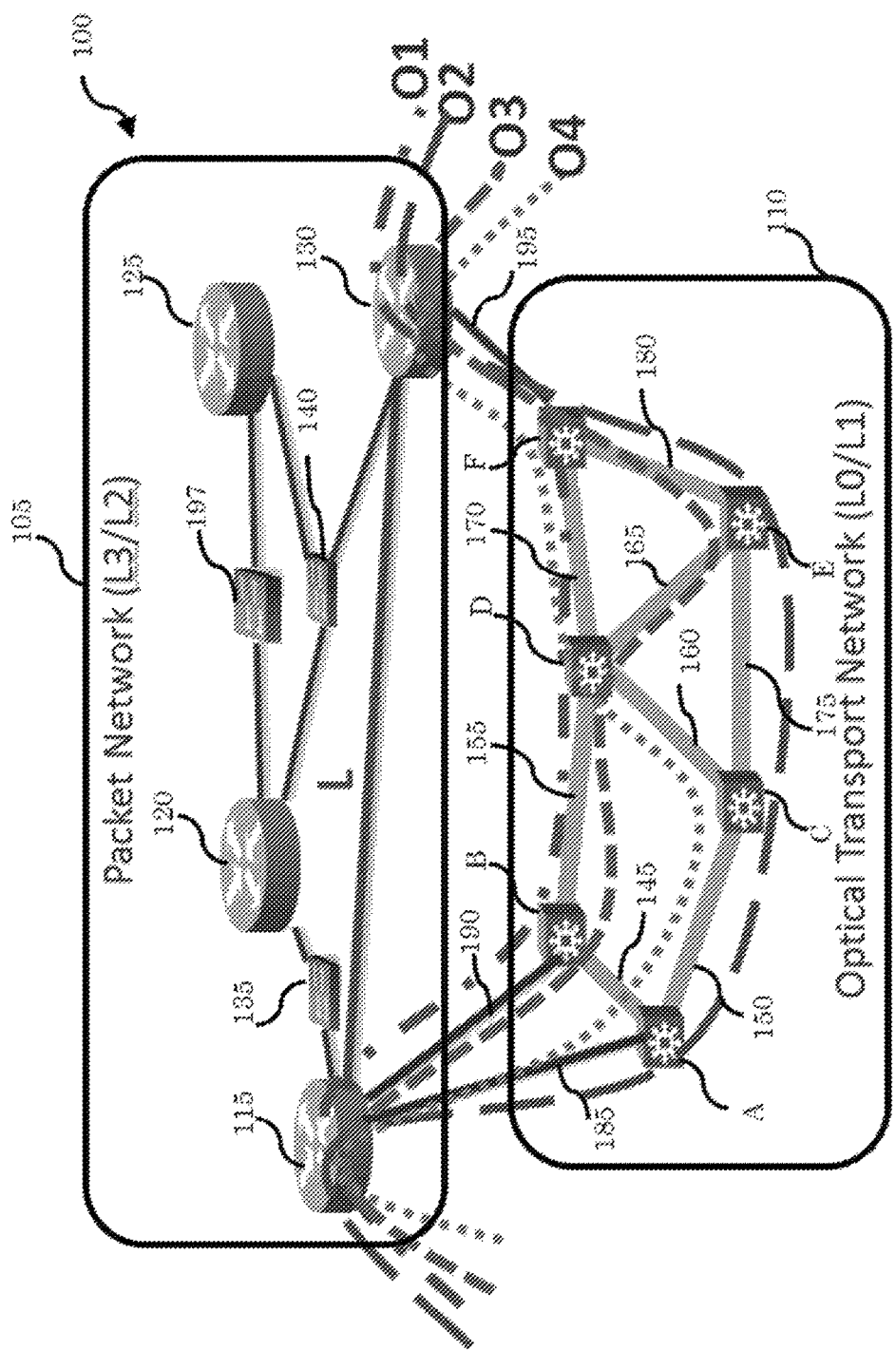
FIG. 1 is a system diagram showing an example topology illustrating aspects of transport segment routing (TSR).

SR-enabled nodes forward packets using SR forwarding tables and segment identifications (SIDs). A packet enters a network of nodes that are SR enabled via an ingress SR edge node, travels along a segment which includes at least one SR node, and exits the network via an egress SR edge node.

There are different types of segments in SR, including nodal and adjacency segments. A nodal segment identifies a node in the network uniquely, whereas an adjacency segment identifies an interface on a specific SR node, and hence, is locally significant. A segment is typically represented by a Multi-Protocol Label Switching (MPLS) or Internet Protocol version 6 (IPv6) label, which is carried in each packet. As with MPLS label switching, executing an SR instruction can involve PUSH, NEXT (Pop), or CONTINUE (Swap) actions on a router.

Transport segment routing (TSR), as discussed herein, includes a multi-layer control plane that can provide greater automation of network service provisioning and maintenance, can offer integrated packet-optical services, and can allow dynamic binding of transport (e.g., optical) and packet networks when offering those services. Integrated packet-transport services are a set of network services in both the transport and packet portions of the network which can be used meet application-specific constraints such as bandwidth, latency and link and node protection characteristics. Dynamically binding the transport and packet networks can allow cross-connects between the packet and optical networks be set up or torn down in response to network events. As used herein, a packet portion of a network is that part of the network that carries packet traffic, e.g., data is transmitted in packets based on a destination address in each packet. Each packet may traverse different paths through the packet portion of the network, and, at the destination node, the data in each packet is extracted and re-assembled. The packet portion of the network can refer to those portions of the network involved in packet routing. As further used herein, a transport portion of the network is that part of the network in which data is transmitted or carried over one or more connections. The transport portion of the network can refer to those portions of the network involved in transport. Packets can be transported over the transport portion of the network, and may be encapsulated, e.g., using a transport header, for this purpose.

In the SR architecture, MPLS based services such as L3VPN and L2VPN can be set up to tunnel through a SR transport domain. The SR architecture thus has no insight into the transport layer topology, and the SR packet layer cannot choose a specific route within the transport layer. While tunneling permits the end points and associated services to be transparent to the routing in the SR domain, the binding between end-points/services and segments is static, and each edge device needs to maintain such static bindings. TSR, in contrast, can include an end point mapping service to assist transport segment routing and facilitate dynamic binding between end-points and segments while mitigating the amount of end-point/service to segment mapping state that needs to be maintained on each edge router.

Techniques discussed herein relate to OAM mechanisms for transport segment routing (TSR). OAM for transport segments is not supported by current packet layer or transport layer OAM standards, which are not coordinated across layers. For example, a failure in the transport layer is not detected by the packet layer OAM, and a failure in the packet layer is not detected by the transport layer OAM. TSR OAM as discussed herein integrates performance and fault monitoring across the packet and transport domains to provide integrated monitoring of transport segments.

SR nodes forward packets using SR forwarding tables and segment identifications (SIDs). A packet enters a network of nodes that are SR enabled via an ingress SR edge node, travels along a segment which includes at least one SR node, and exits the network via an egress SR edge node.

There are different types of segments in SR, including nodal and adjacency segments. A nodal segment identifies a node in the network uniquely, whereas an adjacency segment identifies an interface on a specific SR node, and hence, is locally significant. A segment is typically represented by a Multi-Protocol Label Switching (MPLS) or Internet Protocol version 6 (IPv6) label, which is carried in each packet. As with MPLS label switching, executing an SR instruction can involve PUSH, NEXT (Pop), or CONTINUE (Swap) actions on a router.

TSR, as discussed herein, includes a multi-layer control plane which can provide greater automation of network service provisioning and maintenance, can offer integrated packet-optical services, and can allow dynamic binding of transport (e.g., optical) and packet networks when offering those services. Integrated packet-transport services are a set of network services in both the transport and packet portions of the network which can be used meet application-specific constraints such as bandwidth, latency and link and node protection characteristics. Dynamically binding the transport and packet networks can allow cross-connects between the packet and optical networks be set up or torn down in response to network events.

FIG. 1 is a system diagram showing an example topology 100 which illustrates aspects of TSR. Topology 100 includes a packet network 105 and a transport network 110. Packet network 105 can be described as corresponding generally to a network layer of topology 100, and transport network 110 can be described as corresponding generally to a transport layer of topology 100. In some implementations, transport network 110 can also be described as including a physical layer of topology 100.

Packet network 105 includes packet aware routers 115, 120, 125, 130, 135, and 140, which are capable of packet switching. Packet aware routers are capable of decoding packets for routing. Routers 115, 120, 125, 130, 135, and 140 are in communication within packet network 105 over a number of packet links and nodes. For example, link L connects router 115 with router 130 in the packet domain. In the example of packet network 105, router 115 and router 130 are geographically separated and not directly connected—i.e., link L does not represent a direct or "one-hop" physical connection, but rather, represents a logical connection in the packet domain. At a lower level of abstraction, packets are transported between router 115 and router 130 over transport network 110.

Transport network 110 includes transport nodes A, B, C, D, E and F. It is noted that while transport network 110 is described with respect to optical technology for the sake of illustration, other transport technologies may be used (e.g., wired or radio frequency wireless). Transport nodes A, B, C, D, E and F can include any suitable optical transmission device, such as a fiber-optic repeater, optical receiver/transmitter, optical router, and/or other suitable device for transporting information over transport network 110, and typically do not decode packet headers for routing. Both router 115 and router 130, which do decode packets for routing, are connected to transport network 110, and information can take a number of paths from router 115 to packet aware router 130 through transport network 110.

Routers 115 and 130 are edge devices of the transport network 110 and include circuitry configured to interface the packet network 105 with the transport network 110. Routers 115 and 130 can include, for example, packet-optical gateways (POGs) or packet-transport gateways (e.g., for non-optical transport implementations). Router 115 is in communication with transport node A via transport link 185. Router 115 is also in communication with transport node B via transport link 190. Router 130 is in communication with transport node F via transport link 195. It is noted that router 115 and 130 could be connected to optical nodes A, B, and F via a different kind of link (e.g., non-optical), or routers 115 and/or 130 could be co-located with or could include optical nodes A, B, and F respectively in other implementations. Transport nodes A, B, C, D, E and F are in communication within transport network 110 over transport links 145, 150, 155, 160, 165, 170, 175, 180, 185, 190, and 195. Transport links 145, 150, 155, 160, 165, 170, 175, 180, 185, 190, and 195 can include any suitable optical medium for transmitting data, such as fiber optic cable. It is noted however that transport links 145, 150, 155, 160, 165, 170, 175, 180, 185, 190, and 195 may include any other suitable transport medium based on the technology of transport network 110 (e.g., electrically conductive cable and/or an air interface).

Viewed from the perspective of packet network 105, packet aware router 115 is only one logical hop away from packet aware router 130, via link L. However packets transmitted from router 115 to router 130 via logical link L are actually transported between router 115 and router 130 over several links of transport network 110. Transport network 110 does not decode headers for routing, and typically the details of transport network 110 are not accessible to routers and other devices in packet network 105.

FIG. 1 shows several example physical paths through transport network 110. For example, path O1 transits optical nodes B, D, and F via transport links 190, 155, 170, and 195. Path O2 transits optical nodes B, F, G, and E via transport links 185, 150, 175, 180, and 195. Path O3 transits optical nodes C, D, G, and E via transport links 190, 155, 165, 180, and 195. Path O4 transits optical nodes B, F, D, and E via transport links 185, 150, 160, 170, and 195. Each of these paths can be referred to as a transport segment. The various transport links 145, 150, 155, 160, 165, 170, 175, 180, 185, 190, and 195 each may have different characteristics, and accordingly, transport segments O1, O2, O3, and O4 each may have different characteristics. These characteristics can include latency, bandwidth, reliability, or security characteristics, for example. Routers 115 and 130, can advertise the available optical paths O1, O2, O3, and O4 to the packet network 105 as different transport segments using labels. For example, router 115 advertises O1, O2, O3, and O4 to routers 135 and 120, router 130 advertises O1, O2, O3, and O4 to router 140. Router 120 and/or router 140 may advertise O1, O2, O3 and O4 to router 125. The process can continue until all nodes in the packet network (i.e., packet network 105 have topological information about the transport network (i.e., transport network 110), including transport segments.

An application transmitting packets over packet network 105, for example over a path which includes link L from router 115 to router 130, can leverage the advertised segments to indicate a preference for certain transport characteristics. For example, if path O1 has a particular low latency, and path O2 has a particular high reliability but higher latency, an edge router of the transport segment routing enabled network can push (i.e., append) a label corresponding to O1 onto a packet to indicate a preference for the low latency path, or can push a label corresponding to O2 to indicate a preference for the high reliability path. The edge router may determine the suitable transport segment characteristic using a deployment specific mechanism. For example, the edge router may receive this information from a network device 197, which may include a path computation element (PCE), a network controller or some embedded logic that receives topological updates about the network. A network controller can include a centralized entity configured to receive information about different transport paths and/or segments, and can use this information to create different paths having different characteristics. The network controller has knowledge of the topology of the network and can compute best paths through the network. A PCE can include a device that computes paths with constraints in the network. In either case, network device 197 can be centralized, having a view of the entire network administrative domain over which it has control. The network device 197 (e.g., edge router logic, PCE, or the network controller) may obtain the topological update information by participating in appropriate protocols that flood information about the topology of the network. Packet flooding is a computer network routing algorithm in which every incoming packet is sent through every outgoing link except the link on which it arrived. This label is used by the transport links 145, 150, 155, 160, 165, 170, 175, 180, 185, 190, and 195 to route the packet over the appropriate transport segments through transport network 110.

Figure 2:
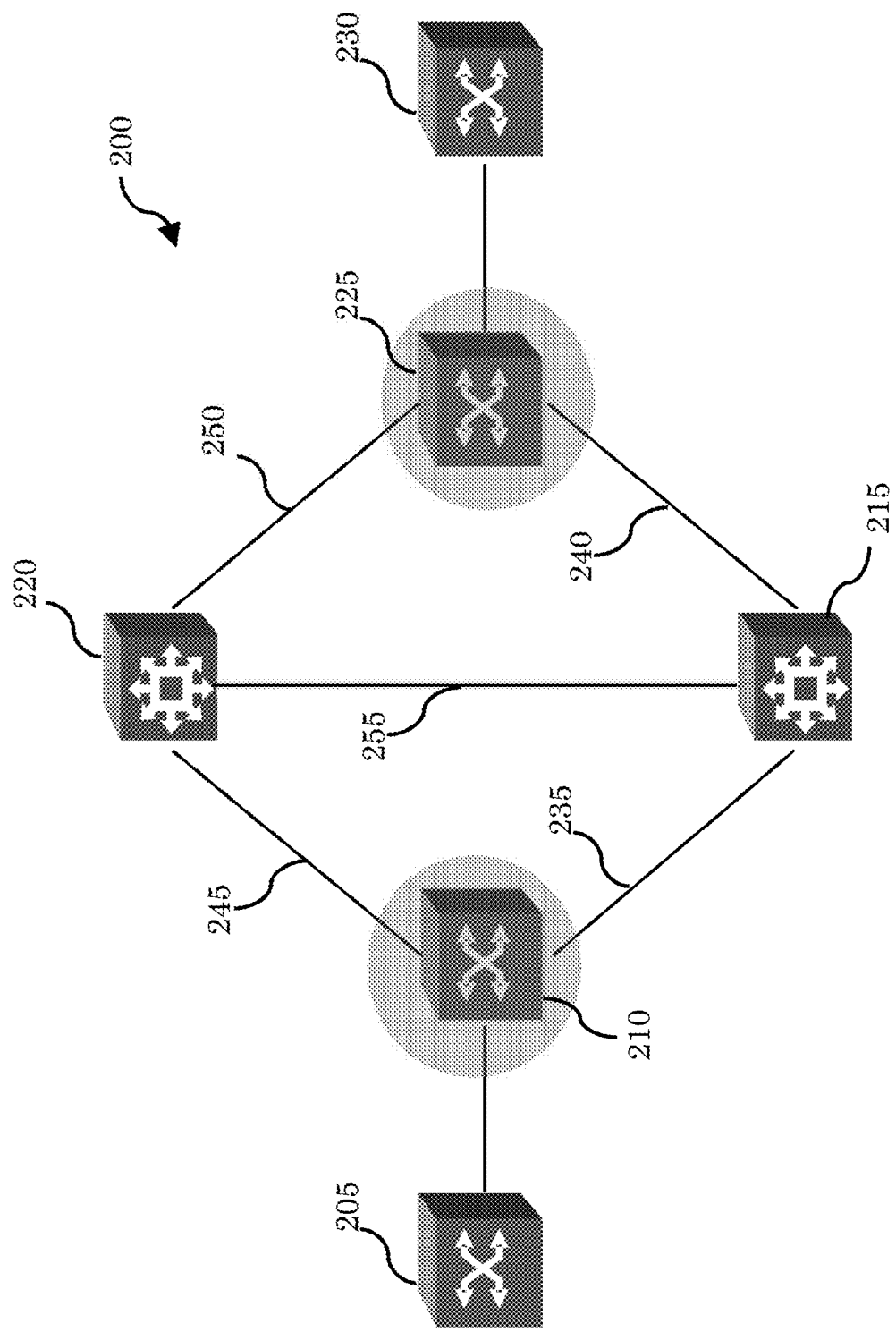
FIG. 2 is a system diagram showing another example topology which illustrates aspects of TSR.

FIG. 2 is a system diagram showing another example topology 200 which illustrates aspects of TSR. Topology 200 is similar to topology 100, and includes a packet layer and a transport layer. Topology 200 includes packet nodes 205 and 230, and transport nodes 220 and 215. In topology 200, transport nodes 220 and 215 are optical routers, however other technologies can be used (e.g., wired or radio-frequency wireless). Packet nodes 205 and 230 are packet routers. Topology 200 also includes nodes 210 and 225, which are edge devices of a transport segment routing enabled network which include circuitry configured to interface the packet layer with the transport layer, and which can be described as packet-optical gateways (POGs) or packet-transport gateways. Nodes 210 and 225 thus have features both of packet nodes and transport nodes.

Node 210 has a one-hop packet layer link with node 225 (not shown), however at the transport layer of abstraction, nodes 210 and 225 communicate via transport node 220, transport node 215, or both, over transport links 235, 240, 245, 250, and 255. Such communications may take one of several paths, or transport segments, across transport node 220, transport node 215, or both, over transport links 235, 240, 245, 250, and 255. In this example, a first path over transport links 245 and 250 via transport node 220 can be advertised as transport segment O1 to the packet domain by nodes 210 and 225. A second path over transport links 235 and 240 via transport node 215 can be advertised as transport segment O2 to the packet domain by nodes 210 and 225. A third path over transport links 245, 255, and 240 via transport nodes 220 and 215 in that order can be advertised as transport segment O3 to the packet domain by nodes 210 and 225. A fourth path over transport links 235, 255, and 250 via transport nodes 215 and 220 in that order can be advertised as transport segment O4 to the packet domain by nodes 210 and 225. A packet PCE can include these transport segments O1, O2, O3, and O4 in specifying paths for reaching node 230 from node 205 based on service needs (e.g., a required latency or bandwidth for example) by including them in the appropriate segment lists or label stacks.

In order to handle OAM functions for the transport segments in topologies 100 or 200 as shown with respect to FIGS. 1 and 2, a TSR OAM device can be implemented which can communicate with network elements of these topologies.

Figure 3:
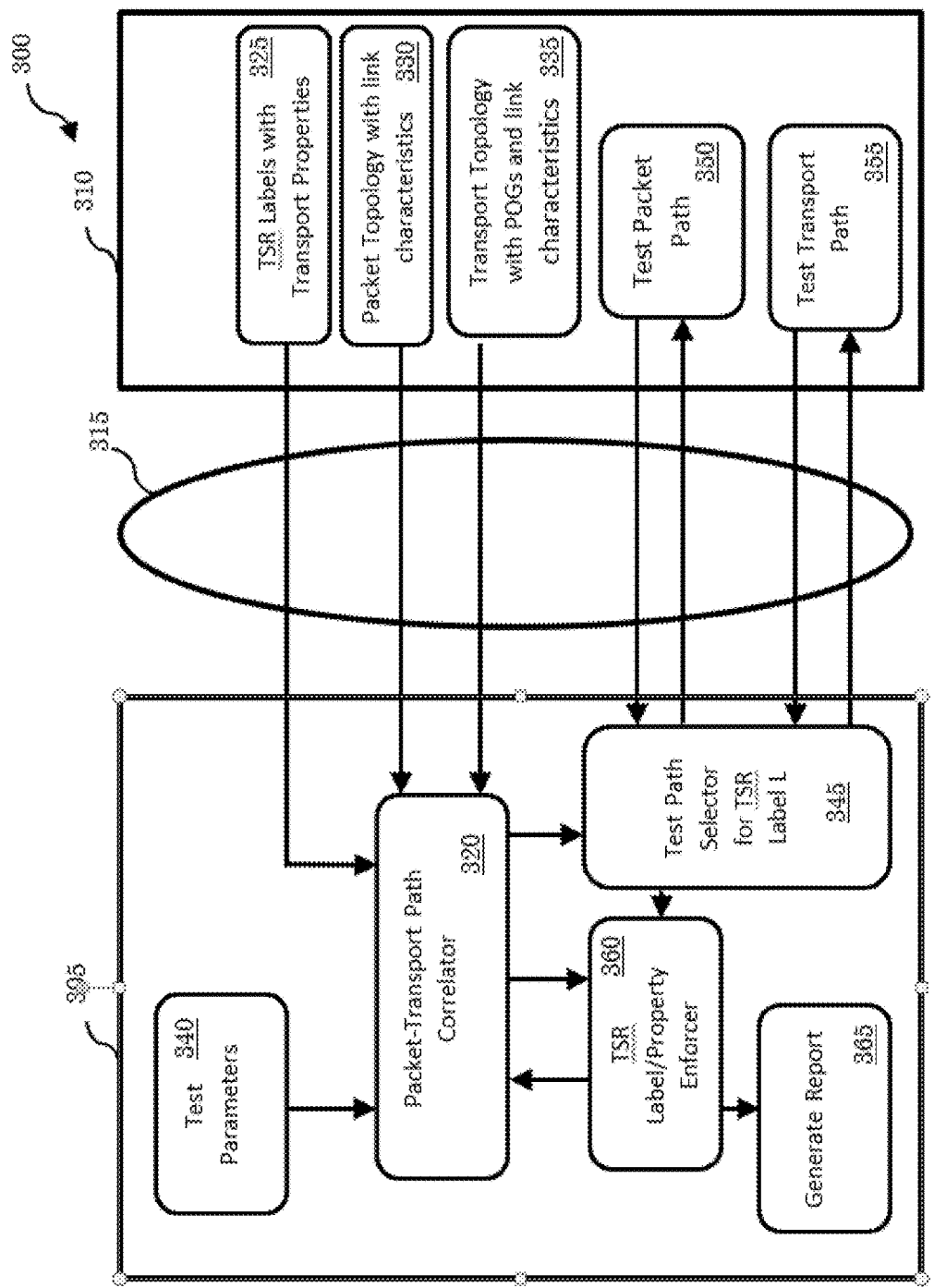
FIG. 3 is a system diagram showing an example topology which illustrates a TSR OAM controller.

FIG. 3 is a system diagram which illustrates an example topology 300 which includes TSR OAM controller 305 in communication with a node 310 over a computer communications network 315. In the example of FIG. 3, a TSR OAM property verification function is illustrated. Computer communications network 315 can be any suitable network or combination of networks that includes a packet layer and a transport layer, and which supports TSR.

Node 310 in this example is a POG similar to router 115 as shown and described with respect to FIG. 1. For example, node 310 is both packet aware and transport aware, and can communicate with other packet nodes in its network via a packet network interface and a transport network interface. Node 310 advertises multiple TSR segments (e.g., including optical paths) having various properties (e.g., latency, throughput, etc.) to the packet network using labels.

TSR OAM controller 305 is in communication with node 310 and other nodes via network 315. Controller 305 provides various functionality for implementing TSR OAM, which is described in this example in terms of discrete functional blocks for ease of illustration. It is noted however that the functions can be implemented in other combinations within the scope of the invention. TSR OAM controller 305 can also be implemented in a decentralized manner such that one or more functions are carried out by separate devices. Functions can also be rearranged, omitted, or added as appropriate.

In the example implementation of FIG. 3, TSR OAM controller 305 includes correlation circuitry 320 for correlating information regarding packet aspects and transport aspects of transport segments. Correlation circuitry 320 receives TSR labels 325 and their associated transport properties, packet layer topology information 330, transport layer topology information 335, test parameters 340, and outputs test paths to test path selector circuitry 345.

Packet layer topology information 330 is received from node 310 in this example, however in general this information can be received from any router which is part of network 315, such as an edge router, or from several such routers. Packet layer topology information 330 can include addressing and locator information such as IP prefixes, system IDs, and labels, as well as network topology information such as peering and/or neighbor information, and link characteristics for the packet layer (e.g., packet routers and links).

Transport layer topology information 335 is also received from node 310 in this example, however in general this information can be received from any router which is part of network 315, such as an edge router, or from several such routers. Transport layer topology information 335 can include addressing and locator information such as IP prefixes, system IDs, and labels, as well as network topology information such as peering and/or neighbor information, and link characteristics for the transport layer (e.g., optical nodes and links).

TSR labels 325 for transport segments in network 315, and the associated transport properties for those transport segments, are also received from node 310 in this example. In general however, the TSR labels 325 and properties could be received from a different POG within the network if the information is resident in that POG. Further, TSR labels 325 and properties can be communicated to devices in the packet domain, and can be learned from any of those devices.

Test parameters 340 are pre-programmed by a user in this example; however TSR OAM controller 305 may receive this information in any other suitable way. Test parameters 340 may be provided to controller 305 continuously, or may be supplied on-demand. Pre-programmed test parameters can indicate that the test should be performed at a specific time or specific intervals of time, with specific test parameters. Test parameters 340 can include specific intervals of time, latency, payload type, specific wavelengths/paths, etc.

The information received by the correlator 320 is used by selector 345 to select test paths for a transport segment corresponding to one of TSR labels 325. For example, selector 345 can select a test path for an example transport segment corresponding to a TSR segment L. Transport segments, such as transport segment L, include a packet portion and a transport portion. Accordingly, selector 345 (or any other suitable aspect of controller 305) transmits a packet test message 350 and a transport test message 355 to node 310. Packet test message 350 can include a test packet for node 310 to use in testing the packet layer portion of transport segment L, or may include an indication that node 310 should generate or obtain a test packet. Transport test message 355 can include a test packet for node 310 to use in testing the transport layer portion of transport segment L, or may include an indication that node 310 should generate or obtain a test packet.

Node 310 tests the packet path of transport segment L based on packet test message 350 to verify a property of transport segment L. For example, to test the packet path for liveness, node 310 can transmit a ping packet on the packet path and receive a return message. Test packets can include ping packets, test info piggybacked onto data packets, or any other suitable test signals. Based on these tests, node 310 obtains a test result which it communicates to the selector 345 of controller 305 (or any other suitable circuitry of controller 305). It is noted that in addition to or instead of liveness, any other suitable property of the packet path can be tested, such as bandwidth, latency, throughput, reliability, link protection, node protection, or security.

Node 310 tests the transport path of transport segment L based on packet test message 355 to verify a property of transport segment L. For example, to test the transport path for liveness, node 310 can transmit a ping packet on the transport path and receive a return message. Test signals can include ping packets, test info piggybacked onto data packets, or any other suitable test signals. Based on this test, node 310 obtains a test result which it communicates to the selector 345 of controller 305 (or any other suitable circuitry of controller 305). It is noted that in addition to or instead of liveness, any other suitable property of the transport path can be tested, such as bandwidth, latency, throughput, reliability, link protection, node protection, or security.

The selector 345 of controller 305 (or any other suitable circuitry of controller 305) receives the test results for both the packet path and transport path of transport segment L and based on these test results, determines whether the entirety of transport segment L satisfies the property being tested. For example, if the transport path is determined to be live, but the packet path is determined not to be live, selector 345 determines that transport segment L is not live. If the transport path is determined to have a latency which is different from the latency found for the packet path, these latency values are reconciled to determine the latency for the entire transport path. It is noted that in other implementations, this may be handled in node 310.

TSR Label/Property Enforcer 360 includes circuitry for receiving information about paths and their corresponding advertised properties from correlator 320, and for determining whether the advertised property holds in the packet and transport layer (e.g., with no faults). Enforcer 360 can base this determination on test results from selector 345 (e.g., based on packet test message 350 and transport test message 355). For instance, if an example TSR label "10000" is advertised with the additional property of following a path along a certain shared-risk group, the enforcer can determine path "10000" is indeed following such a path. Another example is latency. If an example TSR label "20000" is advertised as representing all paths with a latency of 10 ms, enforcer 360 ascertains whether the underlying path that is represented by label "20000" meets the 10 ms threshold. These properties are exemplary; any number of properties of interest that are advertised along with a TSR label can be investigated by enforcer 345. Enforcer 345 can inform correlator 320 of the results of its determination, and can add these results to report 365.

Controller 305 can generate a report or notification 365 based on the test results for transport segment L. Report 365 can be in any suitable form and can be sent to a user or any desired device in network 315, or can be used internally by controller 305. In some implementations, report or notification 365 can be used to trigger a remedial action by controller 305. The remedial mechanism can depend upon the property being tested, the fault if any, network operator policy, and/or other concerns.

Figure 4:
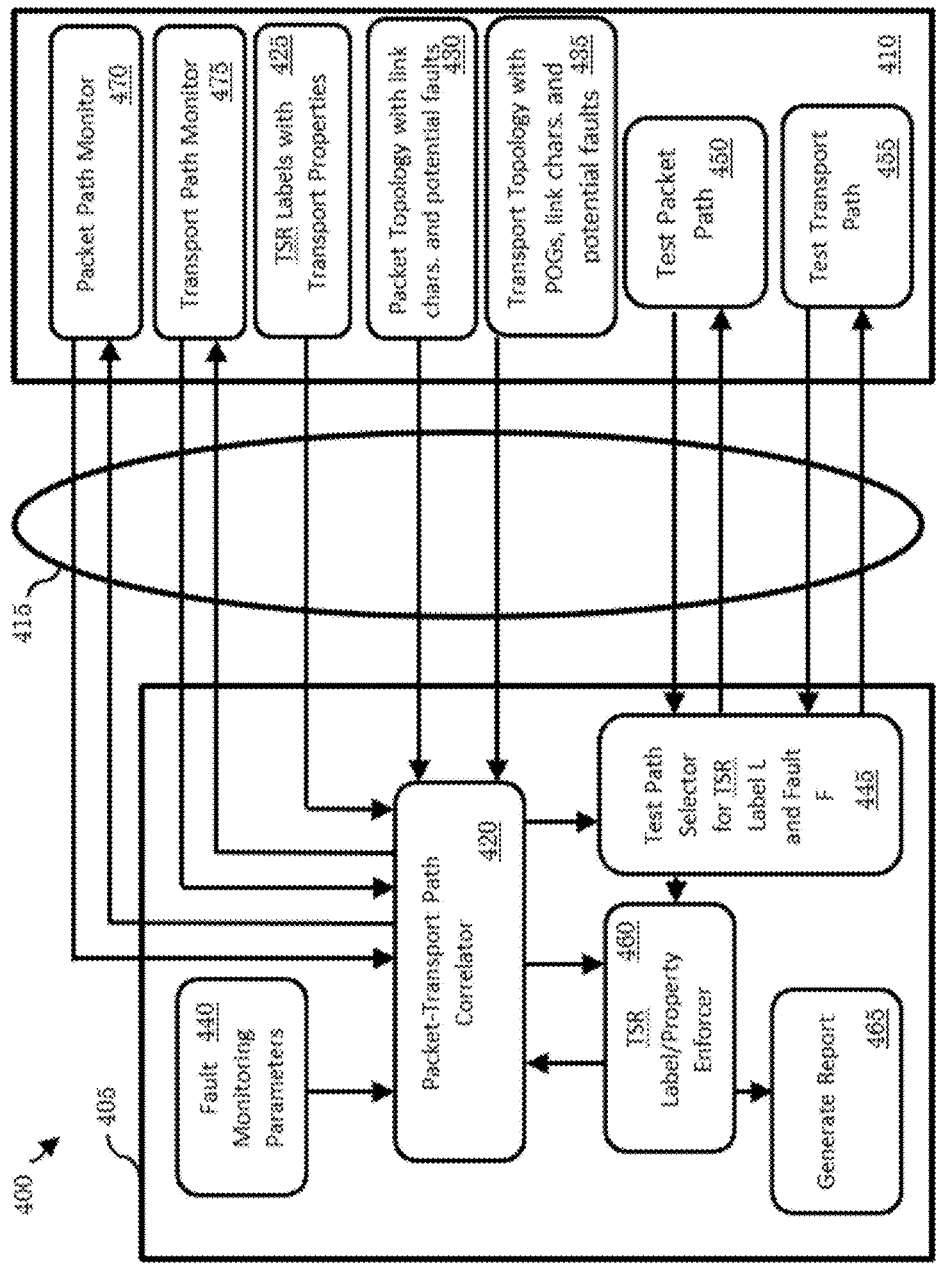
FIG. 4 is another system diagram showing an example topology which illustrates a TSR OAM controller.

FIG. 4 is a system diagram which illustrates an example topology 400 which includes TSR OAM controller 405 in communication with a node 410 over a computer communications network 415. In the example of FIG. 4, a TSR OAM fault detection function is illustrated. Computer communications network 415 can be any suitable network or combination of networks that includes a packet layer and a transport layer, and which supports TSR.

Node 410 in this example is a POG similar to routers 115 and 310 as shown and described with respect to FIGS. 1 and 3. For example, node 410 is both packet aware and transport aware, and can communicate with other packet nodes in its network via a packet network interface and a transport network interface. Node 410 advertises multiple TSR segments (e.g., including optical paths) having various properties (e.g., latency, throughput, etc.) to the packet network using labels.

TSR OAM controller 405 is in communication with node 410 and other nodes via network 415. Controller 405 provides various functionality for implementing TSR OAM, which is described in this example in terms of discrete functional blocks for ease of illustration. It is noted however that the functions can be implemented in other combinations within the scope of the invention. TSR OAM controller 405 can also be implemented in a decentralized manner such that one or more functions are carried out by separate devices. Functions can also be rearranged, omitted, or added as appropriate.

In the example implementation of FIG. 4, TSR OAM controller 405 includes correlation circuitry 420 for correlating information regarding packet aspects and transport aspects of transport segments. Correlation circuitry 420 receives TSR labels 425 and their associated transport properties and potential faults, packet layer topology information 430 and potential faults, transport layer topology information 435, test parameters 440, and outputs test paths to test path selector circuitry 445.

Packet layer topology information 430 is received from node 410 in this example, however in general this information can be received from any router which is part of network 415, such as an edge router, or from several such routers. Packet layer topology information 430 can include addressing and locator information such as IP prefixes, system IDs, and labels, as well as network topology information such as peering and/or neighbor information, and link characteristics for the packet layer (e.g., packet routers and links). Packet layer topology information 430 also includes potential faults which can occur given the topology. Potential faults can include, for example, packet drops, increased latency, misconfiguration, incorrect values for TTL, etc. This list is exemplary and not exhaustive or exclusive.

Transport layer topology information 435 is also received from node 410 in this example, however in general this information can be received from any router which is part of network 415, such as an edge router, or from several such routers. Transport layer topology information 435 can include addressing and locator information such as IP prefixes, system IDs, and labels, as well as network topology information such as peering and/or neighbor information, and link characteristics for the transport layer (e.g., optical nodes and links). Transport layer topology information 435 also includes potential faults which can occur given the topology. Potential faults can include, for example, ineffective network protection due to a persistent link signaling failure, degraded performance such as increased latency, or an increase of bit error rate, etc. This list is exemplary and not exhaustive or exclusive.

TSR labels 425 for transport segments in network 415, and the associated transport properties for those transport segments, are also received from node 410 in this example. In general however, the TSR labels 425 and properties could be received from a different POG within the network if the information is resident in that POG. For example, TRS labels can be flooded in the packet domain. If two POGs are part of the same packet domain, then it is possible to obtain the label information from any of the POGs.

Fault monitoring parameters 440 are pre-programmed by a user in this example; however TSR OAM controller 405 may receive this information in any other suitable way. Test parameters 440 may be provided to controller 405 continuously, or may be supplied on-demand. Fault monitoring parameters 440 can include, for example, monitoring for errors, increased latency, or unexpected values of packets or signals, etc. This list is exemplary and not exhaustive or exclusive The information received by the correlator 420 is used by selector 445 to select test paths and a tested fault for a transport segment corresponding to one of TSR labels 425. For example, selector 445 can select a test path and a tested fault for an example transport segment corresponding to a TSR segment L. Transport segments, such as transport segment L, include a packet portion and a transport portion. Accordingly, selector 445 (or any other suitable aspect of controller 405) transmits a packet test message 450 and a transport test message 455 to node 410. Packet test message 450 can include a test packet for node 410 to use in testing the packet layer portion of transport segment L for the desired fault, or may include an indication that node 410 should generate or obtain a test packet. Transport test message 455 can include a test packet for node 410 to use in testing the transport layer portion of transport segment L for the desired fault, or may include an indication that node 410 should generate or obtain a test packet.

Node 410 tests the packet path of transport segment L based on packet test message 450 to detect a particular fault on the packet path of transport segment L. For example, to test the packet path for latency or round-trip time, node 410 can transmit a ping packet on the packet path and receive a return message. Test packets can include ping packets, test info piggybacked onto data packets, or any other suitable test signals. Based on these tests, node 410 obtains a test result which it communicates to the selector 445 of controller 405 (or any other suitable circuitry of controller 405). It is noted that in addition to or instead of latency or round-trip time, any other suitable potential fault of the packet path can be tested, such as bandwidth, throughput, reliability, link protection, node protection, or security.

Node 410 tests the transport path of transport segment L based on packet test message 455 to detect a fault on the transport path of transport segment L. For example, to test the transport path for round-trip time, node 410 can transmit a ping packet on the transport path and receive a return message. Test signals can include ping packets, test info piggybacked onto data packets, or any other suitable test signals. Based on this test, node 410 obtains a test result which it communicates to the selector 445 of controller 405 (or any other suitable circuitry of controller 405). It is noted that in addition to or instead of round-trip time, any other suitable property of the transport path can be tested, such as bandwidth, latency, throughput, reliability, link protection, node protection, or security.

The selector 445 of controller 405 (or any other suitable circuitry of controller 405) receives the test results for both the packet path and transport path of transport segment L and based on these test results determines whether the entirety of transport segment L is experiencing the fault being tested. For example, if the transport path is determined to have excessive latency, but the packet path is determined not to have excessive latency, selector 445 determines the fault i the transport network. Thereby, we have isolated the problem. As a next step, the controller (or user) can try to isolate the fault to the exact node/link in the transport domain that is responsible for causing the excessive latency. The details of this mechanism are outside the scope of this invention. We can note that this is fairly standard in today's transport networks. It is noted that in other implementations, this may be handled in node 410.

Correlator 420 can set up a packet path monitor 470 and transport path monitor 475 on node 410 to provide real-time fault notification to the controller 405. The correlator can supply sampling frequencies to monitors 470 and 475 to modulate real-time fault notifications for example, or can instead send notifications to request on-demand fault monitoring.

Controller 405 can generate a report or notification 465 based on the test results for transport segment L. Report or notification 465 can be in any suitable form and can be sent to a user or any desired device in network 415, or can be used internally by controller 405. In some implementations, report 465 can be used to trigger a remedial action by controller 405. The remedial mechanism can depend upon the property being tested, the fault if any, network operator policy, and/or other concerns.

TSR OAM test signals can include, for a transport segment, a continuity check (i.e., testing liveness of the path, e.g., using a BFD), connectivity verification (i.e. confirming that a source is connected to a destination, e.g., using a BFD or ping), and/or fault verification (e.g., using a ping). Fault verification can be exercised on demand to validate a reported fault (e.g., using a ping). TSR OAM functionality may operate continuously or on-demand. For example, OAM functions can be performed in a polling mode, continuously monitoring for faults or performance characteristics, or they can be performed on demand, e.g., when a user or controller decides to conduct a test. TSR OAM packets (e.g., a ping for testing latency) can be constrained to follow exactly the same path as dataplane traffic. For example, a TSR OAM packet sent to test latency of transport segment L can be constrained to follow exactly the same transport links and packet links that data transmitted over transport segment L. This can have the advantage of facilitating accurate test results.

TSR OAM packets can follow any available path defined by a corresponding transport segment label. For example, if a transport segment has a property that a return path is different from an outbound path, the TSR OAM packet will follow these paths. In another example, if a transport segment has a property where the transport path will fall back from a transport path having a primary priority to a transport path having a secondary priority, the TSR OAM can be constrained to test both paths.

In TSR OAM, an initiating ingress router can add the remote transport label and control the return path from an egress responder. TSR OAM packets can be initialized from an ingress POG to perform connectivity verification and/or continuity checking to any remote POG within the same optical domain (e.g., defined by an optical domain ID) based on the declared transport segment label. If TSR OAM detects a connectivity check failure, TSR OAM may support a rapid connectivity fault notification to the packet control plane of the POG. The rapid connectivity fault notification can cause the packet control plane of the POG to withdraw the transport segment label associated with the affected path, and/or to take a local protection action, such as switching traffic from the faulty link to a backup link or links.

TSR OAM may be initialized from a centralized controller. If TSR OAM is initialized from a centralized controller, the node (e.g., POG), on receiving an alert (e.g., that a connectivity check failed), can take a local protection action and/or generate an informational message (e.g., to a user interface of the POG). If TSR OAM is initialized from centralized controller, it can support node redundancy based on network configuration. In this context, node redundancy can be provided, for example, where TSR OAM functionality is initiated by one POG (primary), but that POG fails for some reason. If the primary POG fails, OAM functionality can be performed by one or more backup POGs that have been designated to take over OAM responsibility from the primary POG under failure conditions. In some implementations, if a primary initiator of the OAM action (e.g., a POG sending a ping) fails, a secondary initiator can take over the responsibility without any impact, or without substantial impact on customer traffic. TSR OAM can measure packet loss, throughput, and/or delay variation. These measurements can be bidirectional, unidirectional, or dyadic (i.e., where both end points perform loss or delay measurement based on the same message flow).

If a new path is instantiated, TSM OAM can allow path verification without noticeable delay. The above requirements can be implemented such that no scalability limitations are imposed, and such that new segment routing functionality can be accommodated. A per-transport segment state entry can be maintained at the originating POG (i.e. the beginning of the transport portion of the transport segment). If a centralized TSR OAM controller initiates traffic engineering (e.g., mapping traffic to available paths), and if the TSR OAM is performed by one or more POGs (e.g., a case where multiple POGs are involved in the OAM measurement. For example, when two POGs co-ordinate on a measurement of round-trip time of a ping packet), a mechanism can be used to communicate failures from the POG or POGs to the centralized TSR OAM controller. If a path between two POGS is changed (e.g., a local repair in the optical network), TSR OAM circuitry (e.g., in a controller or POG) can measure a relative change in a property (e.g., latency) of the path, and can signal a re-advertisement of the transport segment label.

The TSR OAM ping packet can have a format as defined in the Internet Engineering Task Force (IETF) Request for Comment (RFC) 4379, the contents of which are incorporated herein by reference as if fully set out herein, any update to IETF RFC 4379, or any other suitable format. The TSR OAM BFD packet can have a format as defined in the IETF RFC 5884, the contents of which are incorporated herein by reference as if fully set out herein, any update to IETF RFC 5884, or any other suitable format.

FIGS. 1-4 illustrate topologies for illustrating example TSR OAM techniques. However, it is noted that TSR OAM is applicable to any suitable topology. For example, FIGS. 5-8 illustrate a number of example use cases of TSR OAM with respect to different topological features.

Figure 5:
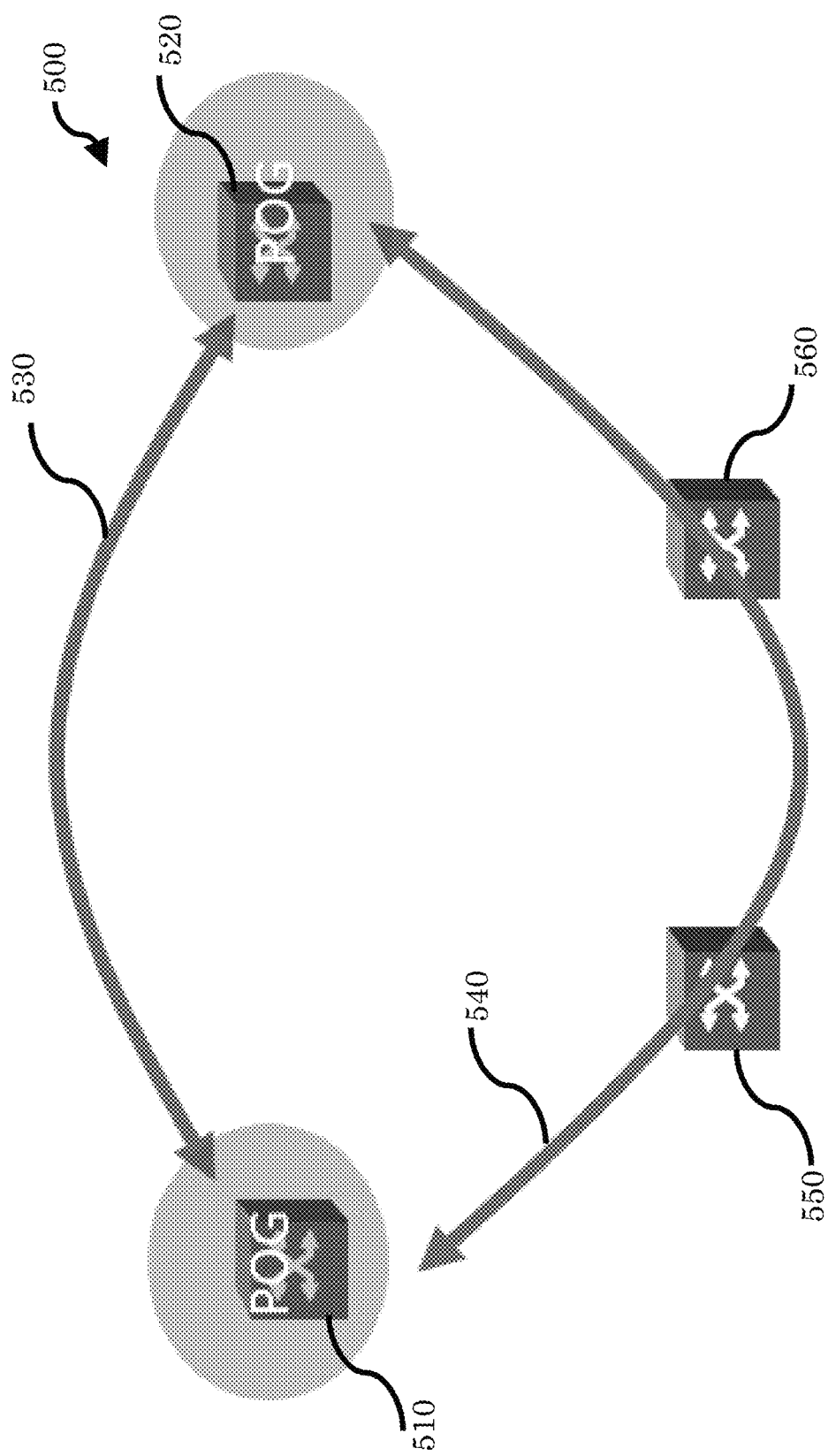
FIG. 5 is a system diagram illustrating an example topology including an integrated packet-optical gateway.

FIG. 5 is a system diagram illustrating a topology 500 configured for TSR OAM in the context of an integrated POG, where packet and optical functions are located in the same node. POGs 510 and 520 are edge devices of the TSR enabled network and communicate via packet link 530. At the transport layer, POGs 510 and 520 communicate over an optical transport link 540 via optical routers 550 and 560. This topology corresponds to the examples of FIGS. 1-4, where the POGs include both packet and optical interfaces. TSR OAM for topology would test both packet link 530 and transport link 540 as described with respect to FIGS. 1-4.

Figure 6:
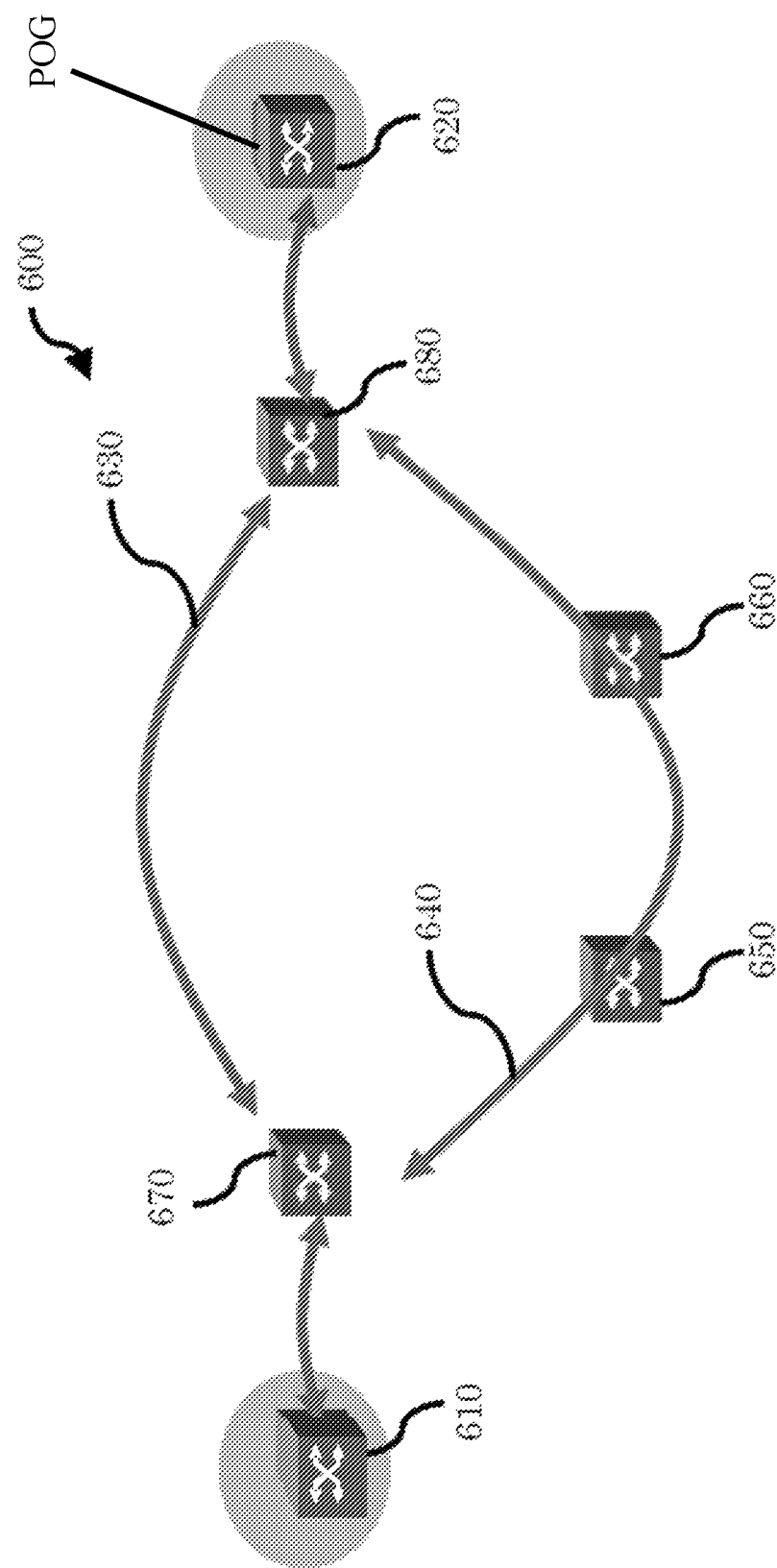
FIG. 6 is a system diagram illustrating an example topology including an gateway with separated packet and optical functions.

FIG. 6 is a system diagram illustrating a topology 600 for TSR OAM in a context where packet and optical functions of a POG are located in separate nodes. POGs 610 and 620 are edge devices of the TSR enabled network and communicate via packet link 630. At the transport layer, POGs 610 and 620 communicate over an optical transport link 640 via optical routers 650 and 660. In Topology 600 the POGs include only packet interfaces; packets are transferred to and from optical nodes 670 and 680 access to the transport link 640. TSR OAM for topology would test both packet link 630 and transport link 640 as described with respect to FIGS. 1-4, except that the optical nodes 670 and 680 may test transport link 640, while POGS 610 and 620 can test packet link 630.

Figure 7:
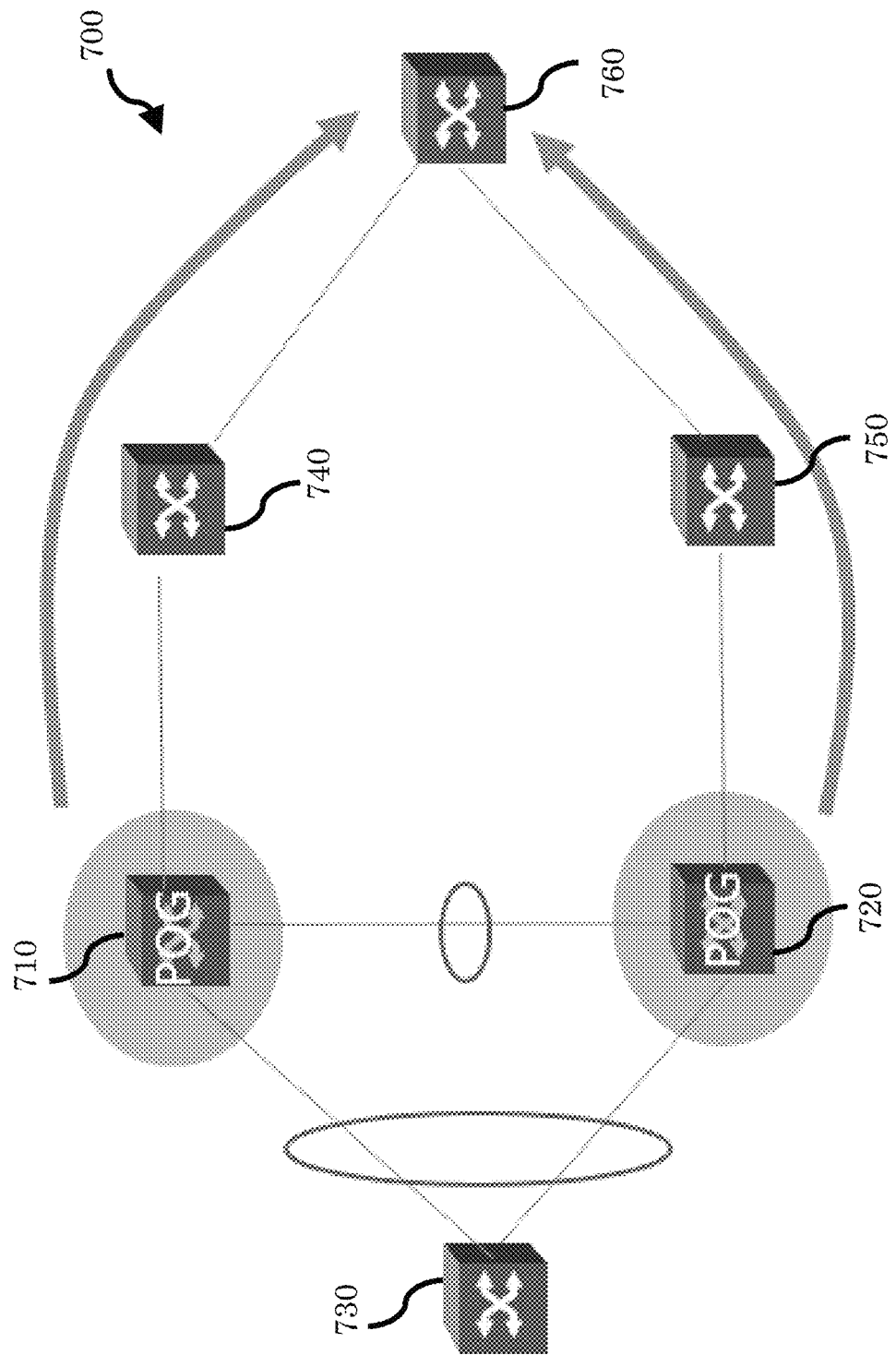
FIG. 7 is a system diagram illustrating an example topology including a dual-homed packet-optical gateway.

FIG. 7 is a system diagram illustrating a topology 700 for TSR OAM in a context which includes a dual-homed POG. In the dual-homed topology, a node can include two separate network interfaces. This is generalizable to multi-homed topologies with arbitrary numbers of network interfaces. In a dual homed POG scenario, both the POGs involved co-ordinate to present a single logical POG interface to the applications. When one POG fails, the other POG takes over the responsibilities in a manner that is transparent to the applications. Here, POGs 710 and 720 coordinate to provide a single logical interface to nodes 730, 740, 750, and 760.

Figure 8:
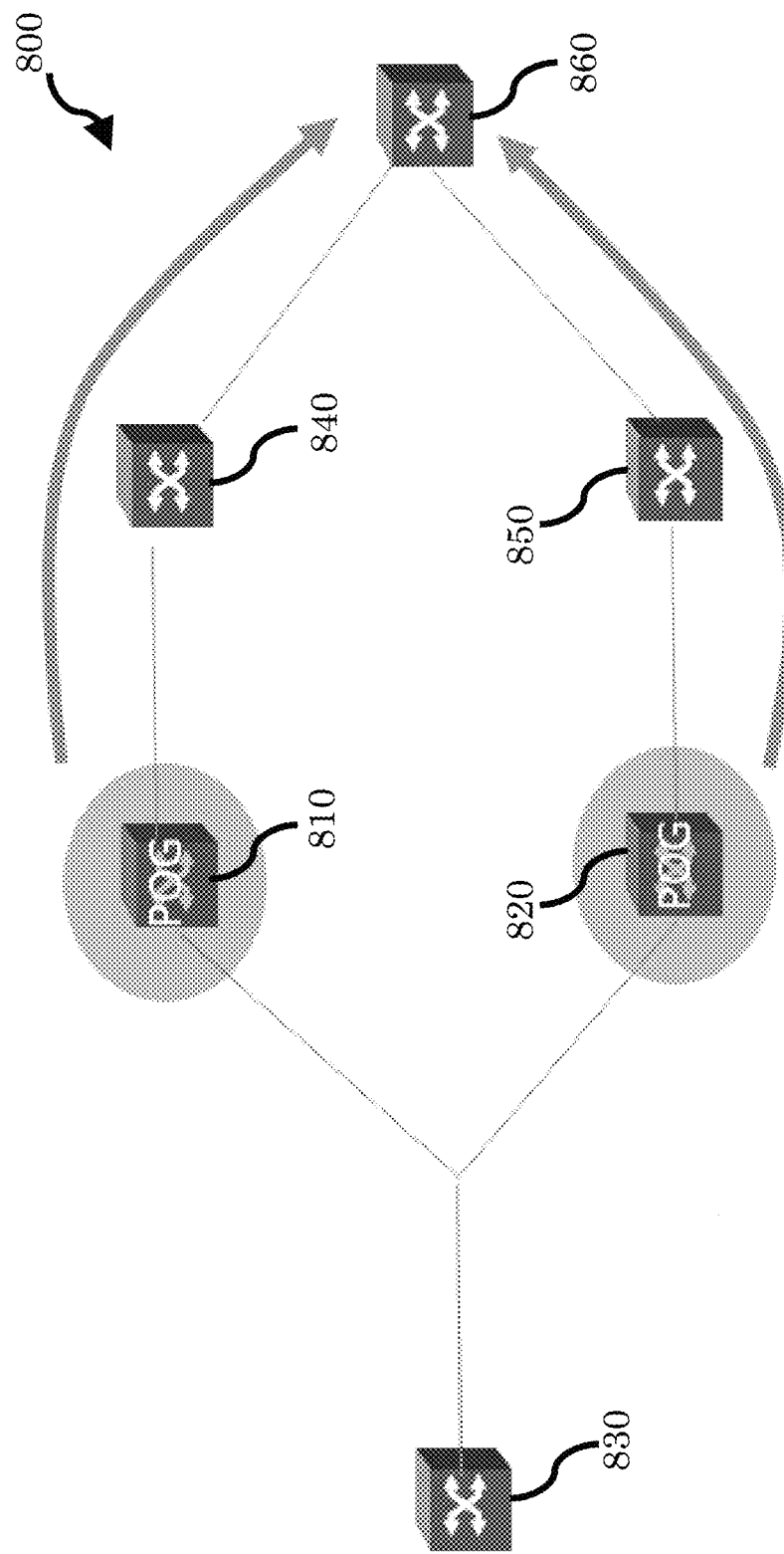
FIG. 8 is a system diagram illustrating an example topology including Y-connected packet-optical gateways.

FIG. 8 is a system diagram illustrating a topology 800 for TSR OAM in a context which includes Y-cable connected POGs. In a Y-cable with POGs, the same signal is sent to multiple POGs. This is one way to present a single logical interface to applications while using redundancy to handle node failures. Here, POGs 810 and 820 both receive the same signals from nodes 830, 840, 850, and 860.

Figure 9:
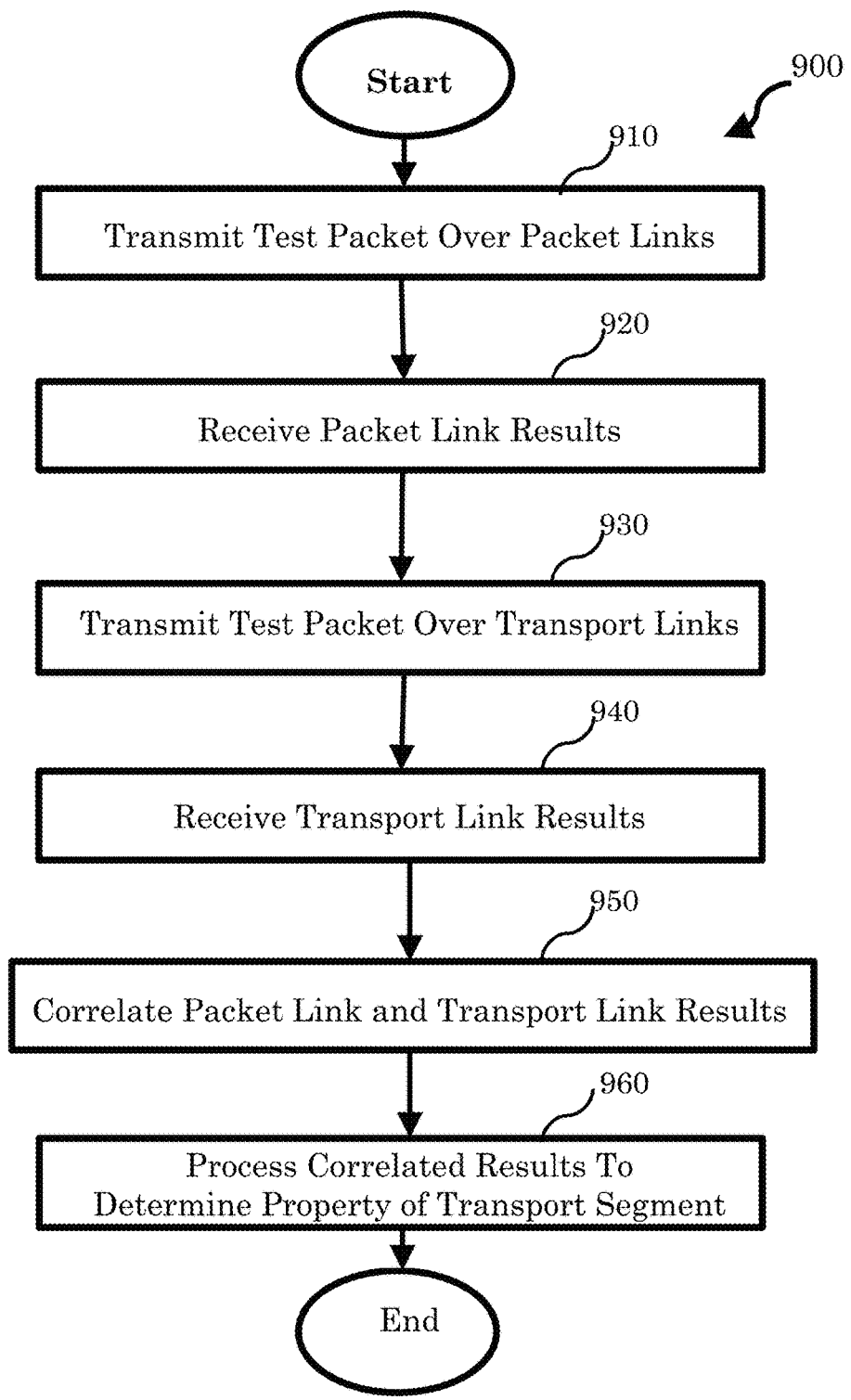
FIG. 9 is a flow chart illustrating an example method for testing a property of a transport segment.

FIG. 9 is a flow chart illustrating a method 900 for testing a property of a transport segment. In step 910 a test packet is transmitted over packet links of a transport segment. For example, a POG may transmit a ping packet over an advertised transport segment via the packet layer. In step 920, the packet layer packet test results are received. For example, a ping packet echo may be received via the packet layer. In step 930, a test packet is transmitted over transport links of a transport segment. For example, a POG may transmit a ping packet over an advertised transport segment via the transport layer. In step 940 the transport packet test results are received. For example, a ping packet echo may be received via the transport layer. In step 950, the packet link and transport link results are correlated and in step 960 the correlated results are processed to determine a property of the transport segment. For example, if latency is the property of the transport which is being tested, delays through the packet layer and through the transport layer can be combined to determine an overall latency for the transport segment.

Figure 10:
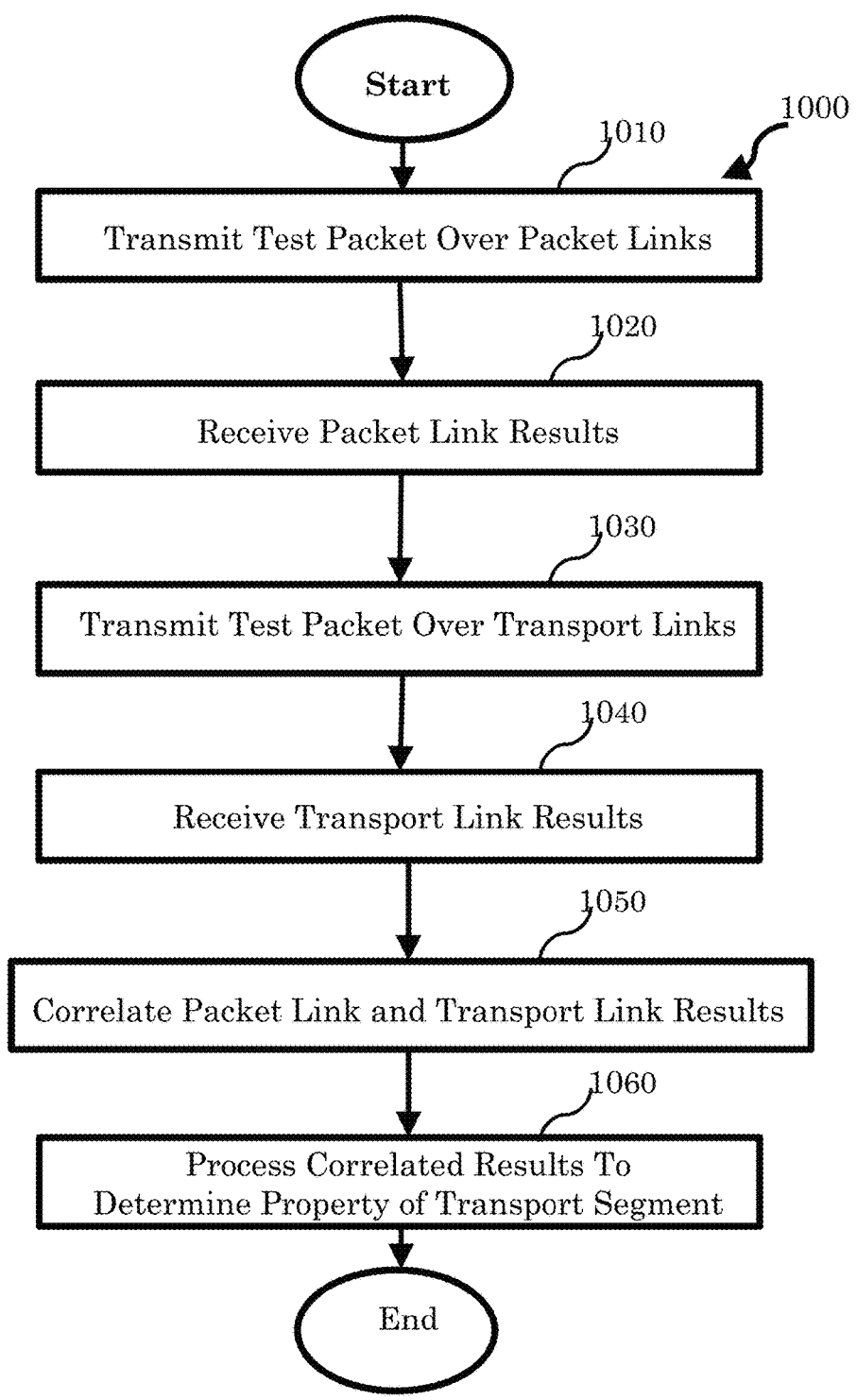
FIG. 10 is a flow chart illustrating an example method for detecting and/or isolating a fault in a transport segment.

FIG. 10 is a flow chart illustrating a method 1000 for detecting and/or isolating a fault in a transport segment. In step 1010 a packet network and transport network topology are received, including link characteristics and potential faults.

In step 1020, a test packet is transmitted over packet links of a transport segment based on the received topology and potential faults. For example, if an excessive latency fault is being tested, a POG may transmit a ping packet over an advertised transport segment via the packet layer. In step 1030, the packet layer packet test results are received. For example, a ping packet echo may be received via the packet layer. In step 1040, a test packet is transmitted over transport links of a transport segment based on the received topology and potential faults. For example, a POG may transmit a ping packet over an advertised transport segment via the transport layer. In step 1050 the transport packet test results are received. For example, a ping packet echo may be received via the transport layer. In step 1060, the packet link and transport link results are correlated and in step 1070 the correlated results are processed to determine whether the tested fault is present. For example, if excessive latency is the fault which is being tested, delays through the packet layer and through the transport layer can be combined to determine an overall latency for the transport segment, which can be compared against a threshold to determine whether the latency is great enough to trigger a fault, or can be analyzed to isolate whether the fault occurs in the transport layer or the packet layer.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of determining a property of a transport segment in a packet-based network, the method comprising:
    transmitting a packet portion test packet over a packet portion of the transport segment;
    receiving packet portion results in response to the packet portion test packet;
    transmitting a transport portion test packet over a transport portion of the transport segment;
    receiving transport portion results in response to the transport portion test packet;
    correlating the packet portion results and the transport portion results to generate correlated test results; and
    processing the correlated test results to determine the property of the transport segment,
    wherein the packet portion test packet and the transport portion test packet are transmitted by a packet-transport gateway device in response to receiving a test packet from a transport segment routing (TSR) operations administration and management (OAM) controller.

2. The method of claim 1, further comprising generating and transmitting a notification based on the determined property.

3. The method of claim 2, wherein the notification is transmitted to initiate a remedial measure based on the determined property.

4. The method of claim 1, wherein the packet portion test packet comprises a ping packet or a bidirectional forwarding detection (BFD) packet.

5. The method of claim 1, wherein the packet portion test packet and the transport portion test packet are transmitted by a packet-transport gateway device.

6. The method of claim 1, wherein the property comprises a latency, a bandwidth, a throughput, or a reliability.

7. An apparatus for determining a property of a transport segment in a packet-based network, the apparatus comprising:
    packet transmitter circuitry configured to transmit a packet portion test packet over a packet portion of the transport segment;
    packet receiver circuitry configured to receive packet portion results in response to the packet portion test packet;
    transport transmitter circuitry configured to transmit a transport portion test packet over a transport portion of the transport segment;
    transport receiver circuitry configured to receive transport portion results in response to the transport portion test packet;
    correlation circuitry configured to correlate the packet portion results and the transport portion results to generate correlated test results; and
    processing circuitry configured to process the correlated test results to determine the property of the transport segment, wherein the packet portion test packet and the transport portion test packet are transmitted by a packet-transport gateway device in response to receiving a test packet from a transport segment routing (TSR) operations administration and management (OAM) controller.

8. The apparatus of claim 7, further comprising circuitry configured to generate and transmit a notification based on the determined property.

9. The apparatus of claim 8, wherein the notification is transmitted to initiate a remedial measure based on the determined property.

10. The apparatus of claim 7, wherein the packet portion test packet comprises a ping packet or a bidirectional forwarding detection (BFD) packet.

11. The apparatus of claim 7, wherein the packet portion test packet and the transport portion test packet are transmitted by a packet-transport gateway device.

12. The apparatus of claim 7, wherein the property comprises a latency, a bandwidth, a throughput, or a reliability.

13. A method of detecting a fault in a transport segment in a packet-based network, the method comprising:
    receiving a topology of the packet-based network including link characteristics and potential faults;
    transmitting a packet portion test packet over a packet portion of the transport segment based on the received topology;
    receiving packet portion results in response to the packet portion test packet;

transmitting a transport portion test packet over a transport portion of the transport segment based on the received topology;
receiving transport portion results in response to the transport portion test packet;
correlating the packet portion results and the transport portion results to generate correlated test results; and
processing the correlated test results to determine whether there is a fault in the transport segment,
wherein the packet portion test packet and the transport portion test packet are transmitted by a packet-transport gateway device in response to receiving a test packet from a transport segment routing (TSR) operations administration and management (OAM) controller.

14. The method of claim 13, further comprising generating and transmitting a notification based on whether a fault is determined, wherein the notification is transmitted to initiate a remedial measure based on whether a fault is determined.

15. The method of claim 13, wherein the packet portion test packet or the transport portion test packet comprises a ping packet or a bidirectional forwarding detection (BFD) packet.

16. The method of claim 13, wherein the packet portion test packet and the transport portion test packet are transmitted by a packet-transport gateway device.

* * * * *